Oct. 6, 1936.  A. E. DRISSNER  2,056,835
MACHINE FOR MACHINING BALL AND ROLLER BEARING CUPS AND BALL RACES
Filed May 17, 1935  4 Sheets-Sheet 1

INVENTOR
Alfred E. Drissner
ATTORNEY

Oct. 6, 1936.  A. E. DRISSNER  2,056,835
MACHINE FOR MACHINING BALL AND ROLLER BEARING CUPS AND BALL RACES
Filed May 17, 1935  4 Sheets-Sheet 2

INVENTOR
Alfred E. Drissner
BY
ATTORNEY

Oct. 6, 1936.   A. E. DRISSNER   2,056,835
MACHINE FOR MACHINING BALL AND ROLLER BEARING CUPS AND BALL RACES
Filed May 17, 1935   4 Sheets-Sheet 3

INVENTOR
Alfred E. Drissner
BY
ATTORNEY

Patented Oct. 6, 1936

2,056,835

UNITED STATES PATENT OFFICE 2,056,835

MACHINE FOR MACHINING BALL AND ROLLER BEARING CUPS AND BALL RACES

Alfred E. Drissner, Cleveland, Ohio, assignor to National Acme Company, Cleveland, Ohio, a corporation of Ohio Application May 17, 1935, Serial No. 21,921

24 Claims. (Cl. 29—37)

This invention relates to machines for machining ball or roller bearing cups and ball races, the object of the invention being to provide an automatic multiple spindle machine having an indexible work spindle carrier and an axially supported sliding tool carrier specially arranged or adapted to this particular work whereby the work may be both internally and externally operated upon simultaneously their full length.

A further object of the invention is the provision of a specially organized multiple spindle machine of this type in which the forming tools are carried by a heavy axially supported tool slide reciprocal toward and from the work and having a rocking or oscillating movement whereby the tools will work in a radial direction and cut the full length of the work piece during each oscillating movement, thereby providing a very much simplified machine, rigid in construction and insuring simplicity of tooling, and which will meet the demand for plenty of chip room since the chips can drop directly down from the tools into the pan and whereby also the operations on the work may be performed in much less time than has been possible previously by bars, taper boring tools or drills, thus materially reducing the cutting time which means greater production as well as insuring greater accuracy, this improved machine more than doubling the production since it will do the work in twenty-two seconds instead of sixty seconds as heretofore on other types of machines.

A further object of the invention is the provision of a machine of the kind specified particularly adapted to operate internally of the work by means of simple circular forming tools having a short side-wise travel and in which the external surface of the work may be operated upon simultaneously if desired.

In the present instance, I have illustrated a four-spindle indexible work carrier but the invention is applicable to any desired number of spindles carried by such a carrier or turret and the drawings illustrate a four-spindle machine of the bar type, that is, that kind of a machine in which the work or stock is in the form of tubes fed from the rear through the spindles of the work spindle carrier, but where forgings are to be operated upon, this spindle machine may be in the form of a chucking machine, the work being held as usual in such automatic forms of machines by collets or three-jaw chucks.

In the drawings accompanying and forming a part of this specification, Fig. 1 is a side view of this improved machine.

Figure 4:
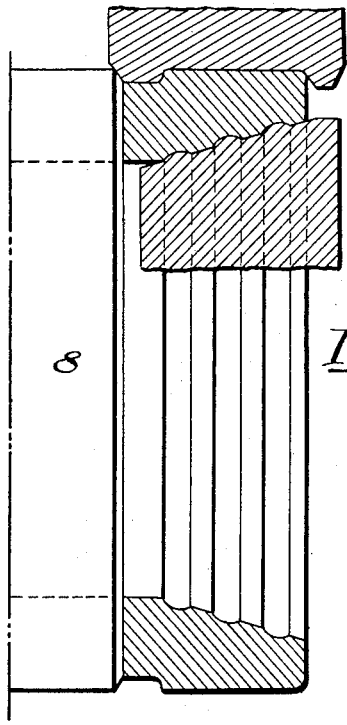
Figure 8:
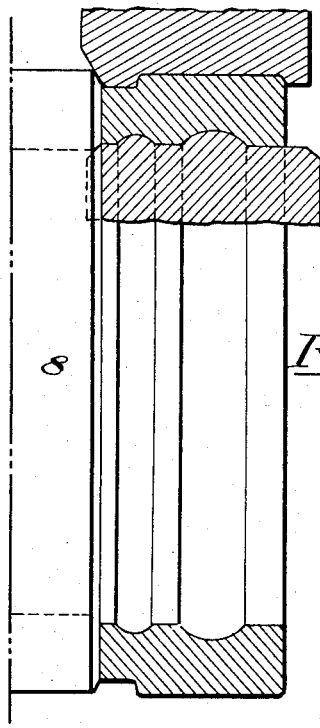
Figure 5:
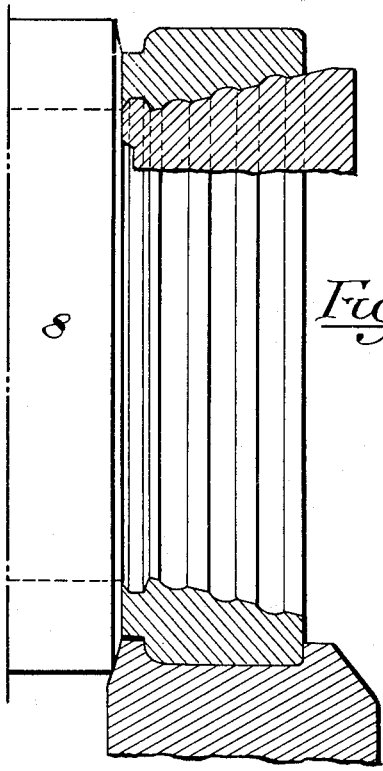
Figure 9:
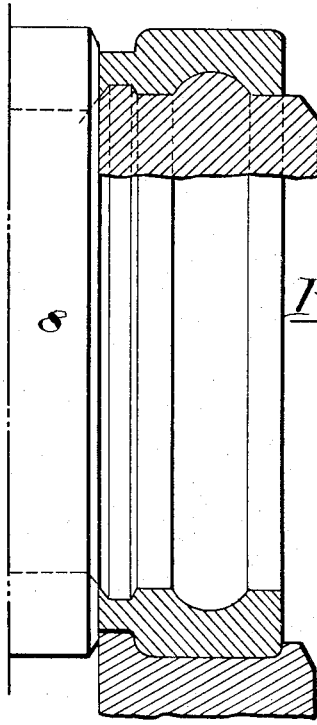
Figure 6:
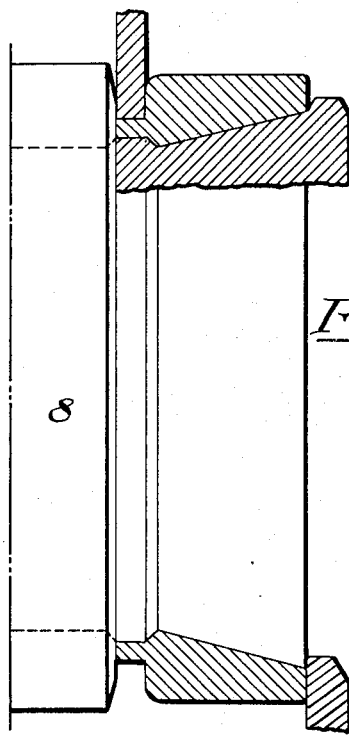
Figure 10:
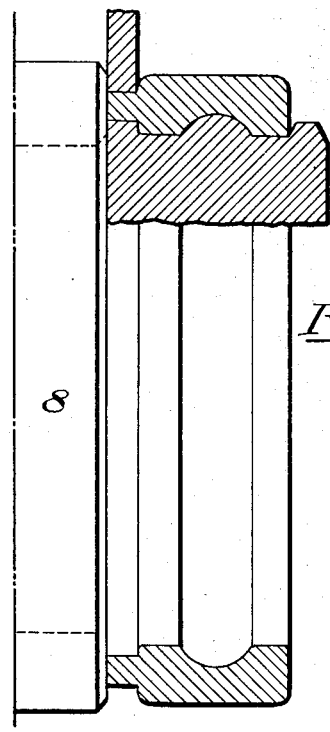
Figure 7:
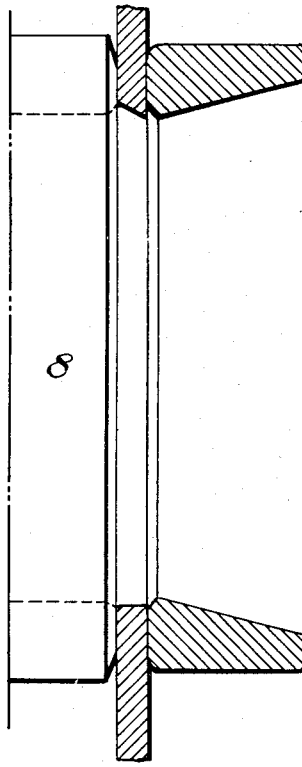
Figure 11:
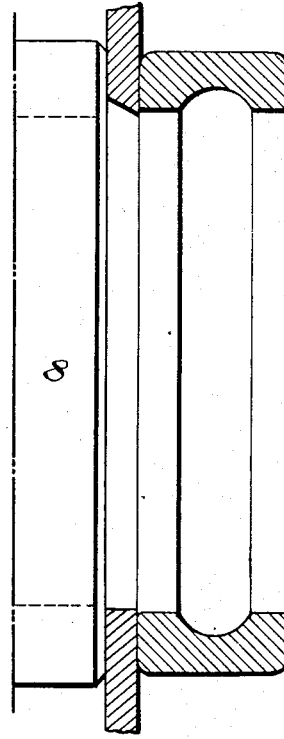

Figs. 4, 5, 6 and 7 illustrate in section a taper roller bearing, Fig. 4 illustrating the 4th position of the work spindle carrier during the rough forming externally and internally of the tapered bearing. In this instance, the bearing is made from tubing and the internal rough forming tool has grooves which will assist in removing the metal quickly and on account of the uneven surface will stand a very heavy cut. Fig. 5 illustrates the first position of the work spindle carrier showing the circular forming tool finish roughing the taper with an uneven surface and recessing the back end of this surface for the necessary bevel and an external tool finish forming the outside diameter of the work and Fig. 6 illustrates the second position of the work spindle carrier wherein the internal diameter is finish formed with a circular forming tool to give a perfectly straight taper and the front inside corner is chamfered with the same tool thereby simplifying the tooling. Simultaneously with the internal forming, the front end of the work piece is faced with the forming slide and the piece is partly cut off with the top slide. Fig. 7 illustrates the piece completely cut off, and Figs. 8, 9, 10 and 11 are similar views illustrating the work on a ball race, Fig. 8 being the fourth position, Fig. 9 the 1st position, Fig. 10 the 2nd position and Fig. 11 the final or cutting off position of the work spindle carrier and in Fig. 8 the internal and external surface is formed; in Fig. 9 the internal surface is completed; in Fig. 10 additional work is done on the ball race and the piece is partly cut off and, in Fig. 11, the ball race is entirely cut off from the stock tube.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments and that the phraseology which I employ is for the purpose of description and not of limitation.

In this improved specially adapted multiple spindle machine, the usual bed 2 is provided with the chip pan 3 and carries a gear housing 4 in which is located the necessary gearing for operating the several parts and into which the cam shaft 5 extends and a work spindle carrier housing 6 in which is located an indexible work spindle carrier 7 having a plurality of rotary work spindles 8.

The main tool slide 9 is axially supported for sliding movement and also rocking or oscillating movement on a stem or tube 10 supported at one end in the gear box and at the other end by two bearings in the spindle carrier housing and this tool carrier 9 is reciprocated by suitable means from a cam drum mounted on the cam shaft 5 and which cam drum is located within the gear housing.

The work spindle carrier is indexed in the usual way by suitable indexing means provided for that purpose and the rotary work spindles are also rotated by the means usually provided in multiple spindle machines. In other words, the main tool slide 9 and the work spindle carrier and its rotary spindles are operated as usual in multiple spindle machines such, for instance, as that shown in the co-pending application of C. W. Simpson and A. E. Drissner, Serial Number 632,490, filed September 10th, 1932, and it is therefore deemed unnecessary to describe this mechanism with more particularity.

When the machine is a bar machine, the usual means for feeding the work is also provided.

In one form of the machine, four forming slides 11, 12, 13 and 14 are provided operated by suitable levers from cam drums 15 and 16 and, in the present instance, the two slides at each side of the machine are operated from the same cam drum located therebelow but with individual cams. These slides carry the external tools and the cam drums are operated from a gear located on the cam shaft 5, which cam shaft also controls the backward and forward movement of the main tool slide, the chuck opening and closing and indexing movement of the work spindle carrier. All of these cam drums are located below the work spindle carrier. Thus, the forming slides referred to are arranged on the sides of the machine so that they are independently operated at the sides and, in some instances, an extra top slide can be provided at the top of the machine to work simultaneously with the side forming slides.

The main tool slide 9 carrying the internal forming tools is preferably made of one piece built very rigidly and slides on the center tube or shaft 10 of the spindle carrier toward and from the work and through this tube 10 the main driving shaft for rotating the spindles extends.

On the cam shaft 5 is located an adjustable eccentric cam 17 in position to co-operate with a forked depending arm 18 secured to or formed integral with the main tool slide 9 so that the rotation of the cam shaft will oscillate the tool carrier 9 and the internal tools carried thereby. This eccentric cam moves with the main tool slide back and forth being keyed to the cam shaft as at 19 and is provided with a pair of flanges 20 in engagement with the front and rear faces of the tool slide arm 18.

Figure 1:
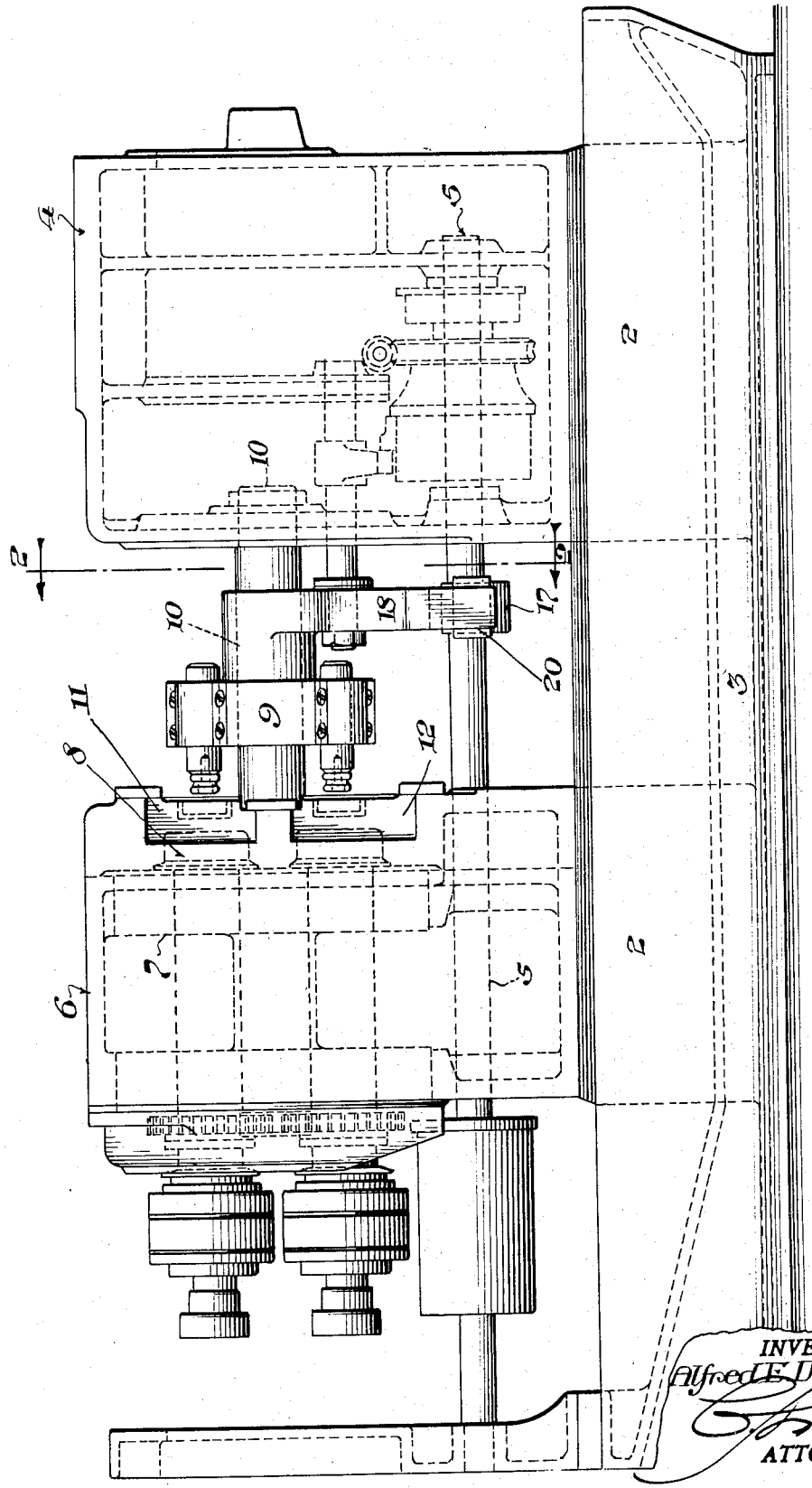
Figure 2:
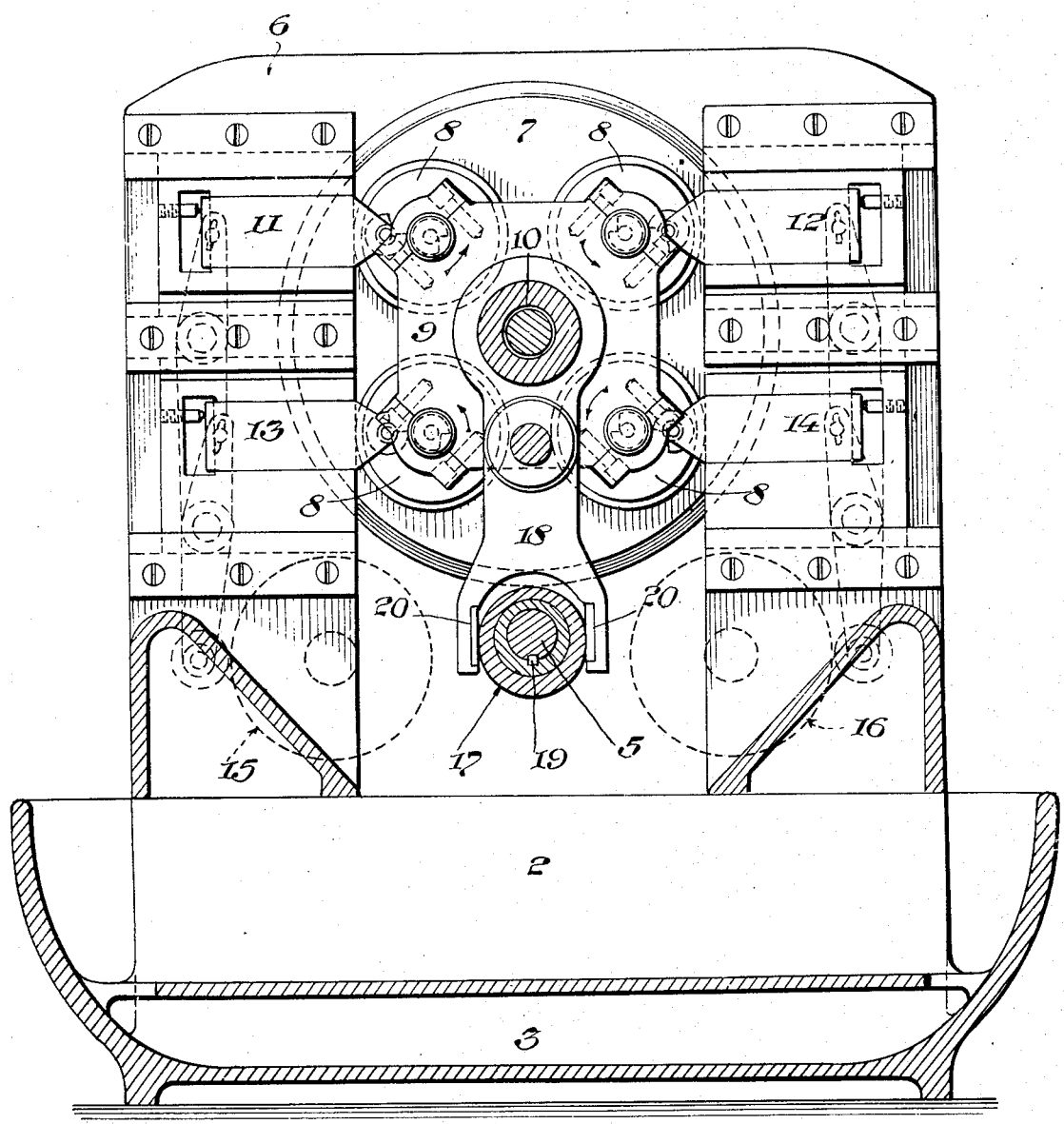
Fig. 2 is a partly cross sectional view taken on the line 2—2 of Fig. 1.
Figure 3:
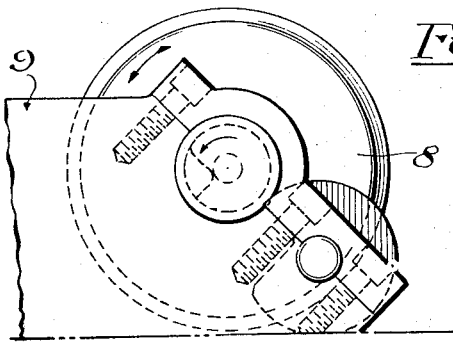
Fig. 3 illustrates a somewhat different form of tool holder which may be used on the main tool slide and by means of which both the internal and external cutting of the work may be performed simultaneously.

The main tool slide 9 carries the internally operating tools mounted thereon by suitable tool holders and in some forms of the invention where, for instance, the depth of the cut both inside and outside would be substantially the same, it is entirely practicable to have this oscillating tool slide carry the externally operating tools instead of mounting them on the cross slides 11, 12, 13 and 14 and all that is necessary in order to do this is to use a more extended tool holder, see for instance, Fig. 3 wherein both an internal and external tool is mounted.

Where, however, the depth of the cut is different on the outside from that on the inside or vice versa, or a greater feed has to be given to the cuts for the external tools, it is preferable to mount the external tools on the slides 11, 12, 13 and 14.

Thus, in a four-spindle machine, it will be observed that successively operating internal circular forming tools are mounted on the main tool slide to operate in three positions, to wit, the 4th, 1st and 2nd positions, Figs. 4, 5 and 6 and a cut-off tool is operated to cut off the piece as shown in Fig. 7, this cut-off tool being carried by an externally operating slide and the circular tools are carried by suitable bars secured to the main tool slide by caps and screws to permit the adjustment of the tools endwise.

By the means provided, the eccentric cam on the cam shaft can be adjusted for side travel or movement of the main tool slide so that the rocking motion of the main tool slide will cause the tools to contact the work side-wise internally to form the piece without any complicated internal recessing tools or internal attachments heretofore used.

Thus, in the present improvement, the piece of work may be internally formed at the same time that the piece is being externally formed either by tools carried on externally located slides or by tools carried on the main tool slide, the internal forming of the work being controlled by an axially supported sliding tool carrier having an oscillating movement and, in operation, the main tool slide moves forward into operative position and stops for the proper engagement of the internal tools with the work. Then, this main tool slide and the tools carried thereby are oscillated or rocked to engage the tools with the work the full depth of the work that is to be done. After the operation is completed, the tools are rocked backward thus clearing themselves from the work when the main tool slide is shifted backward so that the work spindle carrier can be indexed to its next position.

Thus, in this improved machine, the tool slide moves into position to have the internal tools engage the work throughout the depth of the part to be cut and the work is cut, not by the sliding forward of the main tool slide but by the oscillating movement thereof, there being no sliding movement of the tool slide during the internal cutting of the work, that is to say, during the oscillating or rocking movement of the tool slide.

Thus, when the tool slide has been shifted forward to have the tools to engage the piece of work the full depth of the cut that is to be made, the tool slide is oscillated so that the tools will properly cut the work and when the cutting has been completed the tool slide and the tools are oscillated backward to release the tools and then the tool slide is reciprocated to the rear and the spindle carrier indexed, the same operation being repeated on the next piece, the tools being oscillated, as it were, to the right to do the cutting and to the left to be released from the work and then carried away from the work. The tools may be adjusted to the proper depth of the cut by means of cams and during the time that the internal cutting is being performed, the external tools, whether carried by the side tool slides or by the main tool slide in the manner shown in Fig. 3, are also cutting the outer diameter of the work.

It will be seen, therefore, that the spindle carrier indexes one position at a time and that the main tool slide carries several tools so that the piece is rough cut and finished in stages both inside and outside.

In the present instance, the piece is being rough cut and nearly finished at the first two operations while, in the next two operations, the cutting off of the piece is started and finished. Hence, in the present improved machine, instead of using end working tools traveling the full distance of the work, the internal forming tools act as plunge tools cutting the entire interior of the piece at one time instead of step by step as end-wise working tools ordinarily do.

In machines having a greater number of spindles, of course, a greater number of internal operating tools may be used since it will be understood that, with a main tool slide of the shape shown, three or more tools may be used and, by means of the tool holder shown in Fig. 3, a similar number of external operating tools may also be carried on the main tool slide.

From the foregoing, it will be seen that I have provided a very much simplified multiple spindle machine having an indexible work spindle carrier provided with rotatable work spindles and an axially mounted main tool slide having a rocking motion thereby very much facilitating the cutting of pieces of work of the kind described and, in fact, reducing the time for performing this work to less than one-half of that heretofore required while, at the same time, simplifying the tooling operations of the machine and providing for the necessary chip clearance and that the machine is so constructed that its accessibility for tooling and other purposes is very materially increased.

In this present improvement, the speed of the oscillating movement may be increased or decreased in and out of the work without increasing the cam shaft speed and this may be accomplished by means of a path cam and one roll or a plurality of rolls following the cam located on the cam shaft.

Furthermore, the oscillating tool may be locked and a boring, chamfering or radiusing tool carried by the tool holder of the tool slide so that certain types of bearings may be bored or chamfered without any internal forming, if desired, and in this improved machine, especially where a mild steel is used, the production may be increased 60 to 70% over the present standard machines and the cutting time may be decreased by the use of different cams such as just referred to.

It will also be understood that the side-wise travel of the oscillating tool may vary in depth according to the work to be done and that, by the use of individual cams on the cam drum the depth of the forming cut on each side of the machine may be increased or decreased by this individual cam movement and when the machine is used for external and internal cutting of the work, proper means will be provided for the adjustment of the cutting or forming tools side-wise relative to the tool holder and to each other, which adjustment may be obtained by means of a gibbed slide micrometrically adjusted so that the precise diameter of the work need not be regulated by the cam on the oscillating tool slide.

It will also be understood that various forming tools, circular or otherwise may be used.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In a machine of the class described, the combination of an indexible work spindle carrier, a plurality of rotatable spindles therein, a reciprocating tool carrier adapted to carry a plurality of tools, means for reciprocating the entire tool carrier, and means for oscillating said tool carrier whereby on the indexing of the spindle carrier, the same piece of work will be successively operated upon by the successive oscillating tools of the tool carrier.

2. In a machine of the class described, the combination of an indexible work spindle carrier, a plurality of rotatable spindles therein, a reciprocating tool carrier adapted to carry a plurality of tools, means for reciprocating the entire tool carrier, and means for oscillating said tool carrier alternately with its reciprocating movement whereby on the indexing of the spindle carrier, the same piece of work will be successively operated upon by the successive oscillating tools of the tool carrier.

3. In a machine of the class described, the combination of an indexible work spindle carrier, a plurality of rotatable spindles therein, a reciprocating axially supported tool carrier adapted to carry internal operating tools, means for reciprocating the entire tool carrier, and means for oscillating it alternately with its reciprocating movement whereby on the indexing of the spindle carrier, the same piece of work will be successively operated upon by the successive oscillating tools of the tool carrier.

4. In a machine of the class described, the combination of an indexible work spindle carrier, a plurality of rotatable spindles therein, a reciprocating axially supported tool carrier adapted to carry internal operating tools, means for reciprocating the entire tool carrier, means for oscillating it alternately with its reciprocating movement whereby on the indexing of the spindle carrier, the same piece of work will be successively operated upon by the successive oscillating tools of the tool carrier, and a plurality of reciprocating side tool carriers adapted to carry external operating tools operative simultaneously with the internal tools.

5. In a machine of the class described, the combination of an indexible work spindle carrier, a plurality of rotatable work spindles therein, a reciprocating axially supported tool carrier adapted to carry internal operating tools, means for reciprocating the entire tool carrier, and means for oscillating it alternately with its reciprocating movement thereby to cut the piece the full depth of the cut at each oscillation whereby on the indexing of the spindle carrier, the same piece of work will be successively operated upon by the successive oscillating tools of the tool carrier.

6. In a machine of the class described, the combination of an indexible work spindle carrier, a plurality of rotatable work spindles therein, a reciprocating axially supported tool carrier adapted to carry internal operating tools, means for reciprocating the entire tool carrier, means for oscillating it alternately with its reciprocating movement thereby to cut the piece the full depth of the cut at each oscillation whereby on the indexing of the spindle carrier, the same piece of work will be successively operated upon by the successive oscillating tools of the tool carrier, and means for simultaneously operating on the external surface of the work.

7. In a machine of the class described, the combination of an indexible work spindle carrier, a plurality of rotatable work spindles therein, a reciprocating axially supported tool carrier adapted to carry internal operating tools, means for reciprocating the entire tool carrier, means for oscillating it alternately with its reciprocating movement thereby to cut the piece the full depth of the cut at each oscillation whereby on the indexing of the spindle carrier, the same piece of work will be successively operated upon by the successive oscillating tools of the tool carrier, and means for simultaneously operating on the external surface of the work and comprising a series of reciprocating side tools, one for each spindle.

8. In a machine of the class described, the combination of an indexible work spindle carrier, a plurality of rotatable spindles therein, a reciprocating tool carrier adapted to carry both internal and external operating tools, means for reciprocating said carrier with all of its tools, and means for oscillating said tool carrier whereby the external and internal tools will operate simultaneously upon a piece of work carried by the spindles whereby on the indexing of the spindle carrier, the same piece of work will be successively operated upon by the successive oscillating tools of the tool carrier.

9. In a machine of the class described, the combination of a rotatably supported work holder, a reciprocating axially supported tool carrier adapted to carry internal operating tools, means for reciprocating the entire tool carrier, means for oscillating said carrier, and means supported independently of the tool carrier for operating on the external surface of the work.

10. In a machine of the class described, the combination of a rotatably supported work holder, a reciprocating axially supported tool carrier adapted to carry both internal and external operating tools, means for reciprocating the entire tool carrier, and means for oscillating said carrier.

11. An automatic multiple spindle machine for machining ball or roller bearing cups and ball races comprising an indexible work spindle carrier having a plurality of rotary work spindles adapted to carry the work, a reciprocating main tool slide supported axially in alignment with the axis of the work spindle carrier and adapted to carry tools for simultaneously operating on the work carried by the rotary work spindles and operative to carry the tools into position to engage the work the full depth of the cut to be made, and means for oscillating the tool slide and thereby its tools alternately with its reciprocating movement whereby on the indexing of the spindle carrier, the same piece of work will be successively operated upon by successive oscillating tools of the tool carrier.

12. An automatic multiple spindle machine for machining ball or roller bearing cups and ball races comprising a work spindle carrier having a plurality of rotary work spindles adapted to carry the work, a main tool carrier supported axially in alignment with the axis of the work spindle carrier and adapted to carry internal operating tools for simultaneously operating internally on the work carried by the rotary work spindles, means for indexing one of said carriers, means for reciprocating one of said carriers thereby to carry the tools into position to engage the work the full depth of the cut to be made, and means for oscillating one of said carriers alternately with the reciprocating movement of one of said carriers.

13. An automatic multiple spindle machine for machining ball or roller bearing cups and ball races comprising a work spindle carrier having a plurality of rotary work spindles adapted to carry the work, a main tool carrier supported axially in alignment with the axis of the work spindle carrier and adapted to carry internal operating tools for simultaneously operating internally on the work carried by the rotary work spindles, one of said carriers having an indexible movement relative to the other, and one of said carriers having a reciprocating movement relative to the other, whereby the tools will be carried into position to engage the work the full depth of the cut to be made, and means for oscillating the tool carrier and thereby its tools alternately with the reciprocating movement of one of said carriers.

14. In a machine of the class described having indexible means carrying means for simultaneously rotating a plurality of pieces of work, means for axially supporting a plurality of internal operating tools, one for each piece of work, means for oscillating such tools simultaneously in the direction of the cuts to be made, means for carrying the tools into engagement with the work the full depth of the cut to be made, and means for supporting a plurality of external operating tools, whereby on the completion of the cuts the tools will be oscillated away from the cuts and then shifted out of the work and intermediate the retractive oscillating movement of the tools, the work will be indexed from one position to another whereby the same piece of work will be successively operated upon by the successive oscillating tools.

15. In a machine of the class described, the combination of an indexible work spindle carrier, a plurality of rotatable spindles therein, an axially supported reciprocating tool carrier having a depending arm, and means for oscillating said tool carrier alternately with its reciprocating movement and comprising a cam shaft and an eccentric cam carried thereby and co-operating with said depending arm.

16. In a machine of the class described, the combination of an indexible work spindle carrier, a plurality of rotatable spindles therein, an axially supported reciprocating tool carrier having a depending arm, and means for oscillating said tool carrier alternately with its reciprocating movement and comprising a cam shaft and an eccentric cam carried thereby and co-operating with said depending arm and movable with said slide.

17. In a machine of the class described, the combination of an indexible work spindle carrier, a plurality of rotatable spindles therein, a reciprocating axially supported tool carrier having a depending forked arm, and means for oscillating said tool carrier alternately with its reciprocating movement and comprising a cam shaft, an adjustable eccentric cam carried thereby and movable with said slide and engaged by said forked depending arm.

18. In a machine of the class described, combination of an indexible work spindle carrier, a plurality of rotatable spindles therein, a reciprocating axially supported tool carrier having a depending arm, a cam shaft, means cooperating with said cam shaft and with said depending arm for reciprocating the tool carrier, and means for oscillating said tool carrier alternately with its reciprocating movement and comprising means carried by the cam shaft and also co-operating with said depending arm.

19. In a machine of the class described, the combination of an indexible work spindle carrier, a plurality of rotatable spindles therein, a reciprocating axially supported tool carrier having a depending arm, a cam shaft, means co-operating with said cam shaft and with said depending arm for reciprocating the tool carrier, and means for oscillating said tool carrier alternately with its reciprocating movement and comprising means carried by the cam shaft and also co-operating with said depending arm and comprising an eccentric cam mounted on said shaft.

20. An apparatus for machining ball or roller bearing cups and ball races comprising means for holding and rotating a plurality of pieces of work, means for indexing the work, and means operative during the rotation of the work and intermediate the indexing thereof to oscillate a plurality of tools to operate on the work and on the completion of such oscillating movement to reciprocate all such tools from and toward the work whereby the same piece of work will be successively operated upon by successive oscillating tools.

21. An apparatus for machining ball or roller bearing cups and ball races comprising means for holding and rotating a plurality of pieces of work, means for indexing the work, and means operative during the rotation of the work and intermediate the indexing thereof to oscillate a plurality of tools to operate on the work internally and on the completion of such oscillating movement to reciprocate all such tools from and toward the work whereby the same piece of work will be successively operated upon by successive oscillating tools.

22. An apparatus for machining ball or roller bearing cups and ball races comprising means for holding and rotating a plurality of pieces of work, means for indexing the work, means operative during the rotation of the work and intermediate the indexing thereof to oscillate a plurality of tools to operate on the work internally and on the completion of such oscillating movement to reciprocate all such tools from and toward the work whereby the same piece of work will be successively operated upon by successive oscillating tools, and a plurality of external tools for operating externally on the work simultaneously with the internal operation on the work.

23. An apparatus for machining ball or roller bearing cups and ball races comprising means for holding and rotating a plurality of pieces of work, means for indexing the work, means operative during the rotation of the work and intermediate the indexing thereof to oscillate a plurality of tools to operate on the work internally and on the completion of such oscillating movement to reciprocate all such tools from and toward the work whereby the same piece of work will be successively operated upon by successive oscillating tools, and a plurality of external reciprocating side tools for operating on the work simultaneously with the internal operations thereon.

24. An apparatus for machining ball or roller bearing cups and ball races comprising means for holding and rotating a plurality of pieces of work, means for indexing the work, means operative during the rotation of the work and intermediate the indexing thereof to oscillate a plurality of axially supported tools to operate on the work internally and on the completion of such oscillating movement to reciprocate all such tools from and toward the work whereby the same piece of work will be successively operated upon by successive oscillating tools, and means for operating externally on the work simultaneously with the operation thereon of the internal operating tools.

ALFRED E. DRISSNER.